Feb. 12, 1935.
H. C. VANTASSEL
Re. 19,457
RAILWAY TRAFFIC CONTROLLING APPARATUS
Original Filed Oct. 15, 1929
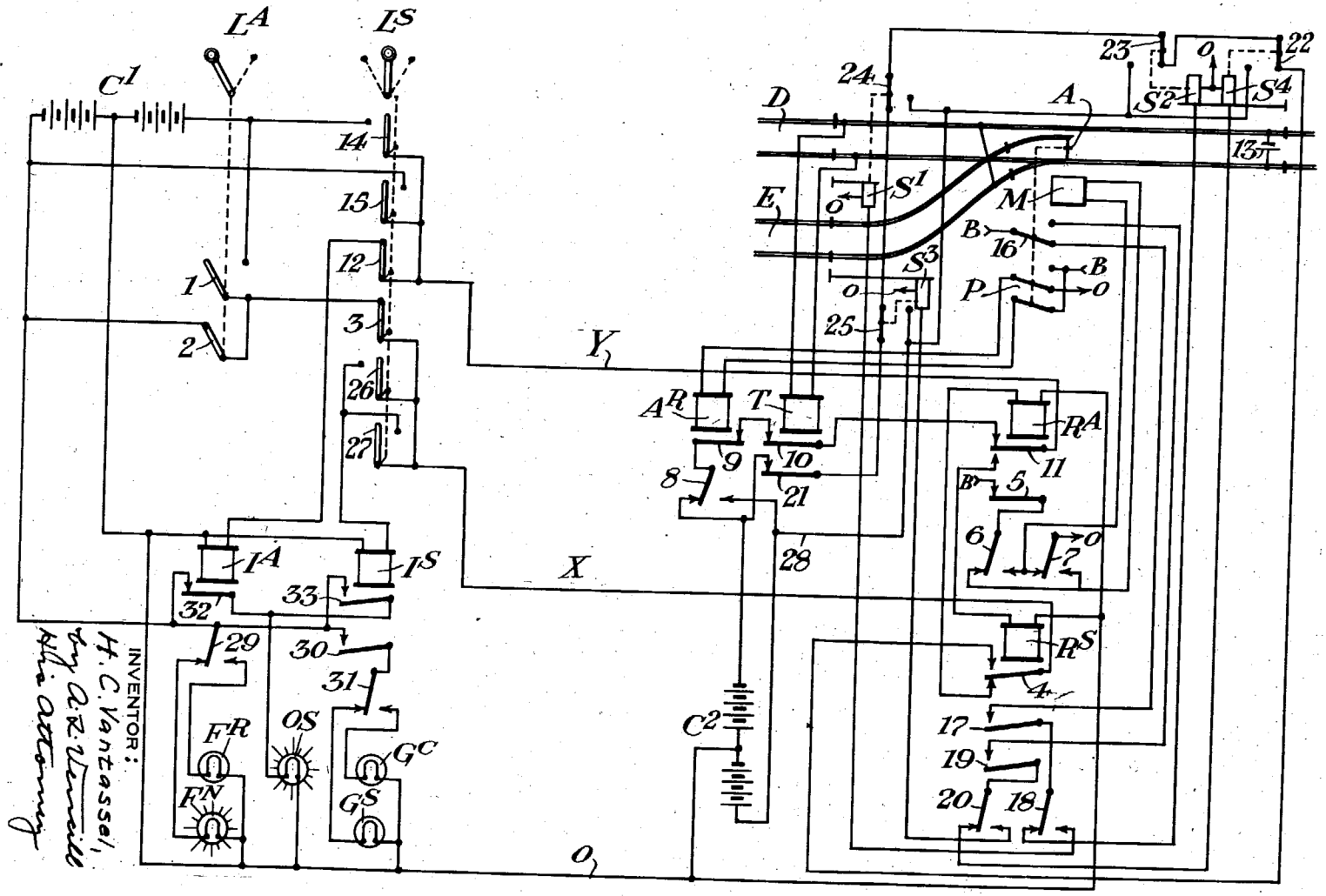
INVENTOR:
H. C. Vantassel,
by A. R. Vernall
His Attorney Reissued Feb. 12, 1935

Re. 19,457

UNITED STATES PATENT OFFICE 19,457

RAILWAY TRAFFIC CONTROLLING APPARATUS

Harry C. Vantassel, Swissvale, Pa., assignor to The Union Switch & Signal Company, Swissvale, Pa., a corporation of Pennsylvania Original No. 1,854,967, dated April 19, 1932, Serial No. 399,776, October 15, 1929. Renewed December 22, 1930. Application for reissue March 20, 1934, Serial No. 716,536

14 Claims. (Cl. 246—135)

My invention relates to railway traffic controlling apparatus of the type involving switches and signals controlled by manually operable levers located at a remote point, and has for an object the provision of means for accomplishing the necessary control and indication with a minimum number of line wires between the control point and the controlled device.

I will describe one form of apparatus embodying my invention, and will then point out the novel features thereof in claims.

The accompanying drawing is a diagrammatic view illustrating one form of apparatus embodying my invention.

Referring to the drawing, the reference character D designates a railway track which is provided with a switch A leading into another track E. The switch A is operated by a mechanism M of any suitable type, and this mechanism is in turn controlled by a switch control relay $R^A$. As here shown, this relay is of the polarized type, that is, it is selectively responsive to the polarity of the current by which it is energized.

Traffic over the switch A is controlled by signals $S^1$, $S^2$, $S^3$ and $S^4$. These signals are controlled by a polarized signal control relay $R^S$.

The switch A operates a pole-changer P, which pole-changer in turn controls a switch repeating relay $A^R$, so that this relay is energized in normal or reverse direction according as the switch A is in the normal or the reverse position.

The portions of tracks D and E associated with the switch A are provided with a track circuit comprising the usual track battery 13 and the usual track relay T.

Located at a remote point, such as an interlocking tower or a dispatcher's office, is a switch control lever $L^A$ for the control of the switch A, and a signal control lever $L^S$ for the control of the signals S. Associated with these levers are a switch indication relay $I^A$ and a signal indication relay $I^S$, which relays control indication lamps F, G and OS, as will hereinafter appear. A battery $C^1$ is located in the interlocking tower, and another battery $C^2$ is located adjacent the switch A.

As shown in the drawing, the switch A is in its normal position, and all of the signals S are in their "Stop" positions. Relay $R^A$ is energized for reasons which will appear hereinafter, and relay $R^S$ is deenergized. I will assume that the operator desires to reverse the switch A. To do this, he will move the lever $L^A$ to reverse position, thereby supplying current of reverse polarity to relay $R^A$, the circuit being from the right-hand terminal of battery $C^1$, through switch lever contact 1, normal signal lever contact 3, line wire X, back point of contact 4 of relay $R^S$, the winding of relay $R^A$, and a common wire O to the middle point of battery $C^1$. The polar contacts of relay $R^A$ will then swing to the right, whereupon current of reverse polarity will be supplied to the switch operating mechanism M, the circuit being from terminal B of a suitable source of current, through front neutral contact 5 of relay $R^A$, right-hand point of polar contact 6, operating mechanism M, and the right-hand point of polar contact 7 to terminal O. Current of this polarity will cause the mechanism M to operate in such manner as to move the switch A to its reverse position. When this has been accomplished, pole-changer P will reverse, thereby supplying current of reverse polarity to the switch repeating relay $A^R$, with the result that the polar contact 8 of its relay will swing to the right. The switch indication relay $I^A$ will then be energized by current of reverse polarity, the circuit being from the lower terminal of battery $C^2$, through polar contact 8 and front neutral contact 9 of relay $A^R$, front contact 10 of track relay T, front point of contact 11 of relay $R^A$, line wire Y, normal contact 12 of signal lever $L^S$, the winding of relay $I^A$, and line wire O to the middle point of battery $C^2$. This will cause polar contact 29 of relay $I^A$ to swing to the right, whereupon a reverse switch indication lamp $F^R$ will be lighted by virtue of a circuit which will be obvious from the drawing.

I will now assume that the operator desires to restore the switch A to its normal position. To do this, he will return lever $L^A$ to its normal position, thereby energizing switch control relay $R^A$ by a circuit which is the same as before, except that it includes the left-hand half of battery $C^1$ and contact 2 on lever $L^A$. The polar contacts of relay $R^A$ will then return to their left-hand positions, whereupon current of normal polarity will be supplied to the switch mechanism M, which current will restore the switch A to its normal position. When this has been accomplished, pole-changer P will return to its normal position, thereby again energizing relay $A^R$ in its normal direction. Switch indication relay $I^A$ will then be energized by virtue of the same circuit as before, except that it will include the upper half of battery $C^2$ and polar contact 8 of relay $A^R$ in its left-hand position. Current of normal polarity thus supplied to relay $I^A$ will cause polar contact 29 of this relay to return to its normal position, whereupon normal indication lamp $F^N$ will become lighted and reverse indication lamp $F^R$ will be extinguished.

I will now assume that with switch A in the normal position, the operator desires to clear signal $S^2$ to permit a train moving toward the left to pass through this switch. To do this, he will swing the signal lever $L^S$ to the left, thereby closing contact 14 and opening contacts 12 and 3. The opening of contact 3 will result in deenergizing the switch control relay $R^A$, whereupon the signal control relay $R^S$ will become energized in the normal direction by virtue of a circuit which passes from the right-hand terminal of battery $C^1$, through contact 14 on switch lever $L^S$, line wire Y, back point of contact 11 of relay $R^A$, winding of relay $R^S$, and common wire O to the middle point of battery $C^1$. This will cause relay $R^S$ to become energized in such direction that the polar contacts 20 and 18 will remain in the positions in which they are shown in the drawing. The operating mechanism of signal $S^2$ will then be energized by a circuit which passes from terminal B, through switch operated contact 16, front neutral contact 17 of relay $R^S$, polar contact 18 of this relay in the left-hand position, and the operating mechanism of signal $S^2$ to terminal O. Assuming that signal $S^2$ does not move to the proceed position, signal indication relay $I^S$ will become energized in the normal direction by virtue of a circuit which passes from the upper terminal of battery $C^2$, through front contact 21 of track relay T, contact 25 operated by signal $S^3$, contact 24 operated by signal $S^1$, contact 23 operated by signal $S^2$, contact 22 operated by signal $S^4$, front point of contact 4 of signal control relay $R^S$, line wire X, contact 26 of signal lever $L^S$, winding of relay $I^S$, and line wire O to the middle terminal of battery $C^2$. A stop indication lamp $G^S$ will then be lighted by virtue of a circuit which passes from the left-hand terminal of battery $C^1$, through front contact 30 of relay $I^S$, polar contact 31 of this relay in the left-hand position, and lamp $G^S$ to the middle terminal of battery $C^1$. The lighting of this lamp will indicate to the operator that the signals are all in the stop position, or in other words, it will indicate that the desired signal has not responded by moving to the clear position. On the other hand, if the signal $S^2$ does respond by moving to the clear or proceed position, signal indication relay $I^S$ will become energized in the reverse direction, the circuit being from the lower terminal of battery $C^2$, through wire 28, contact 23 on signal $S^2$, contact 22 on signal $S^4$, front point of contact 4 of relay $R^S$, line wire X, signal lever contact 26, relay $I^S$ and line wire O to the middle terminal of battery $C^2$. Relay $I^S$ will then be energized in such direction that its polar contact 31 will swing to the right, thereby causing a proceed lamp $G^C$ to become lighted by virtue of a circuit which will be obvious from the drawing. The lighting of this lamp will indicate to the operator that signal $S^2$ has responded by moving to the proceed position.

If the operator desires to clear signal $S^1$ instead of signal $S^2$, he will move the signal lever $L^S$ to the right-hand position, thereby closing contact 15 instead of contact 14. Relay $R^S$ will then become energized in the opposite direction to the energization of this relay caused as just described when lever $L^S$ is moved to the left-hand position for clearing signal $S^2$, for the reason that the circuit will include the left-hand half of battery $C^1$ instead of the right-hand half of this battery. The operating mechanism of signal $S^1$ will then become energized by virtue of a circuit which includes switch contact 16, front contact 17 of relay $R^S$, and polar contact 18 in the right-hand position. The indication of this operation will be the same as before. Should switch A be in the reverse position when lever $L^S$ is moved to the left, signal $S^4$ instead of signal $S^2$ will be moved to the proceed position because of the change in position of the switch operated contact 16, that is to say, the switch operating circuit will pass from terminal B, through contact 16 in its upper position, front contact 19 of relay $R^S$, polar contact 20 in its left-hand position, and the mechanism of signal $S^4$ to terminal O. If signal lever $L^S$ is moved to the right-hand position while switch A is in its reverse position, signal $S^3$ will be moved to the proceed position, for reasons which will be observed from the foregoing description.

The OS lamp is controlled by both of the indication relays $I^A$ and $I^S$ in such manner that this lamp will be lighted when either relay is energized, but will be extinguished when both relays are deenergized. That is to say, lamp OS is provided with a circuit which includes contact 32 of relay $I^A$ and contact 33 of relay $I^S$ in multiple. Assuming that all signals are at stop, and that a train enters the track section associated with the track relay T, this relay will open, thereby opening at contact 10 the circuit for the switch indication relay $I^A$, so that contact 32 of the latter relay will open. Contact 33 of relay $I^S$ already being open, the OS lamp will become extinguished to indicate to the operator that the track section is occupied. Assuming now that the signal lever $L^S$ has been moved to either the right or the left position to clear one of the signals governing traffic over the switch A, the switch indication relay $I^A$ will be deenergized, because its circuit will be open at contact 12 of lever $L^S$. When a train enters the track section it will cause the signal to return to the stop position, because of the usual track relay control, which is not shown in the drawing, and this will close the reverse indication circuit for relay $I^S$ at all points except front contact 21 of track relay T. It follows that relay $I^S$ will remain in its deenergized condition until the train passes out of the track section, at which time track relay T will become energized and relay $I^S$ will become energized in the reverse direction. During the interval in which relay $I^S$ is deenergized, both branches of the circuit for the OS lamp will be opened, so that this lamp will be extinguished to indicate to the operator that a train has accepted the signal. When the train passes out of the track section and track relay T becomes again energized, relay $I^S$ will become energized, so that the OS lamp will be lighted.

It will be seen from the foregoing that I have provided means for controlling and indicating the switch A and the signals S by only three wires, of which wire X is a combined switch control and signal indication wire, wire Y is a combined signal control and switch indication wire, and wire O is a common wire. One important feature of my invention is that the indication relays $I^A$ and $I^S$ are continuously controlled by the switch and the signals respectively over the three line wires X, Y and O, so that any change in the condition of the switch or the signals is immediately reflected by the lamps F, G and OS.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a railway switch, signals governing traffic over said switch, a switch control relay, a signal control relay, a switch control lever, a signal control lever, a switch indication relay, a signal indication relay, a track relay, a switch repeater relay, a combined switch control and signal indication wire X, a combined signal control and switch indication wire Y, a common wire O, a circuit for said switch control relay including a normal signal lever contact and a back contact of said signal control relay as well as said wires X and O, means operated by said switch lever for supplying current of normal or reverse polarity to said switch relay circuit, a circuit for said signal control relay including a back contact of said switch control relay and said wires Y and O, means operated by said signal lever for supplying current of normal or reverse polarity to said signal relay circuit, a circuit for said switch indication relay including a front contact of said switch repeater relay and a front contact of said track relay as well as a front contact of said switch control relay and a normal contact of said signal lever and said wires Y and O, means operated by said switch repeater relay for supplying current of normal or reverse polarity to said switch indication relay circuit, a circuit for said signal indication relay including a front contact of said signal control relay and a right or a left contact on said signal lever, and said wires X and O, means for supplying current of normal or reverse polarity to said signal indication relay circuit according as all of said signals are at stop or one of them is clear, and indication devices controlled by said indication relays.

2. In combination, a railway switch, signals governing traffic over said switch, a switch control relay, a signal control relay, a switch control lever, a signal control lever, a switch indication relay, a signal indication relay, a track relay, a switch repeater relay, a combined switch control and signal indication wire X, a combined signal control and switch indication wire Y, a common wire O, a circuit for said switch control relay including a normal signal lever contact and a back contact of said signal control relay as well as said wires X and O, means operated by said switch lever for supplying current of normal or reverse polarity to said switch relay circuit, a circuit for said signal control relay including a back contact of said switch control relay and said wires Y and O, means operated by said signal lever for supplying current of normal or reverse polarity to said signal relay circuit, a circuit for said switch indication relay including a front contact of said switch repeater relay and a front contact of said track relay as well as a front contact of said switch control relay and a normal contact of said signal lever and said wires Y and O, means operated by said switch repeater relay for supplying current of normal or reverse polarity to said switch indication relay circuit, a circuit for said signal indication relay including a front contact of said signal control relay and a right or a left contact on said signal lever and said wires X and O, means for supplying current of normal or reverse polarity to said signal indication relay circuit according as all of said signals are at stop or one of them is clear, a normal and a reverse switch indication lamp, means for lighting said normal or said reverse lamp according as said switch indication relay is energized in normal or reverse direction, a stop and a proceed signal indication lamp, means for lighting said stop or said proceed lamp according as said signal indication relay is energized in normal or reverse direction, an OS indication lamp, and means for lighting said OS lamp when either said switch or said signal indication relay is energized.

3. In combination, a railway switch, signals governing traffic over said switch, a switch control relay, a signal control relay, a switch control lever, a signal control lever, a switch indication relay, a signal indication relay, a combined switch control and signal indication wire X, a combined signal control and switch indication wire Y, a common wire O, a circuit for said switch control relay including a normal signal lever contact and a back contact of said signal control relay as well as said wires X and O, means operated by said switch lever for supplying current of normal or reverse polarity to said switch relay circuit, a circuit for said signal control relay including a back contact of said switch control relay and said wires Y and O, means operated by said signal lever for supplying current of normal or reverse polarity to said signal relay circuit, a circuit for said switch indication relay including a normal signal lever contact and said wires Y and O, means controlled by said switch for supplying current of normal or reverse polarity to said switch indication relay circuit, a circuit for said signal indication relay including a right or a left contact on said signal lever and said wires X and O, means controlled by said signals for supplying current of normal or reverse polarity to said signal indication relay circuit, and indication devices controlled by said indication relays.

4. In combination, a section of railway track including a switch, a signal governing traffic over said switch, two control wires and a common wire, a circuit for controlling said switch including said common wire and the first of said control wires, a circuit for controlling said signal including said common wire and the second of said control wires, a track circuit for said section including a track relay, a switch indication circuit controlled by said switch and by said track relay and including said common wire and said second control wire, a signal indication circuit controlled by said signal and by said track relay and including said common wire and said first control wire, switch indication means controlled by said switch indication circuit, signal indication means controlled by said signal indication circuit, and track indication means controlled by both said switch indication circuit and said signal indication circuit.

5. In combination, a section of railway track including a switch, a signal governing traffic over said switch, a track circuit for said section including a track relay, a switch indication circuit controlled by said switch and by said track relay, a signal indication circuit controlled by said signal and by said track relay, switch indication means controlled by said switch indication circuit, signal indication means controlled by said signal indication circuit, and track indication means controlled by both said switch indication circuit and said signal indication circuit.

6. In combination, a section of railway track including a switch, a signal governing traffic over said switch, a track circuit for said section including a track relay, a polarized switch indication relay controlled by said track relay and by a pole-changer operated by said switch, a signal indication relay controlled by said track relay and by said signal, switch indication means controlled by normal and reverse polar contacts of said switch indication relay, signal indication means controlled by said signal indication relay, and track indication means controlled by neutral contacts of both said switch indication relay and said signal indication relay.

7. In combination, a railway traffic governing device, a remotely located manually operable lever for controlling said device, a pole-changer controlled by said device, a polarized relay controlled by traffic conditions adjacent said device and responsive to the direction of flow of current through the winding of said relay, means controlled by said pole-changer for causing current to flow in a normal or a reverse direction through the winding of said relay according as said pole-changer is in its normal or its reverse position, indication means for said device located adjacent said lever and controlled by normal and reverse polar contacts of said relay, and traffic indication means adjacent said lever controlled by a neutral contact of said relay.

8. In combination, a railway traffic governing device, a remotely located manually operable lever for controlling said device, a pole-changer controlled by said device, a track relay controlled by traffic conditions adjacent said device, a polarized indication relay, means for energizing said indication relay in one direction or the other in accordance with the position of said pole-changer provided the pole-changer is in one extreme position or the other and said track relay is energized, indication means for said device located adjacent said lever and controlled by normal and reverse polar contacts of said indication relay, and traffic indication means adjacent said lever controlled by a neutral contact of said indication relay.

9. In combination with a railway track switch, a track relay controlled by traffic conditions adjacent the switch, a polarized indication relay at a point remote from the switch, means for energizing said indication relay in one direction or the other in accordance with the position of the switch provided the track relay is energized, switch indication means controlled by normal and reverse polar contacts of said indication relay, and traffic indication means controlled by a neutral contact of said indication relay.

10. In combination, a railway traffic governing device, a remotely located manually operable lever for controlling said device, a pole-changer controlled by said device, a track relay controlled by traffic conditions adjacent said device, a polarized indication relay at a point remote from said device, a polarized line circuit including the contacts of said pole-changer, a front contact of said track relay, and the winding of said indication relay, indication means for said device located adjacent said lever and controlled by the polar contacts of said indication relay, and traffic indication means adjacent said lever controlled by a neutral contact of said indication relay.

11. In combination, two associated railway traffic governing devices, a track relay controlled by traffic conditions adjacent said devices, an indication relay for each device, each controlled in accordance with the condition of the corresponding device and of said track relay, indication means for each device controlled by the corresponding indication relay, and traffic indication means controlled by both said indication relays.

12. In combination, two associated railway traffic governing devices, means controlled by traffic conditions adjacent said devices, an indication relay for each device, located at a point remote from said device, a line circuit for each indication relay, each including contacts controlled by the corresponding device and a contact controlled by said means, indication means for each device controlled by the corresponding indication relay, and traffic indication means controlled by both said indication relays.

13. In combination, a detector section of railway track including a track switch, a switch indication relay located at a point remote from the switch, means including a first line circuit for energizing said relay at times by current of one polarity when the switch is normal and by current of the opposite polarity when the switch is reversed, if the detector section is unoccupied, a second indication relay controlled over another line circuit and arranged to be closed at times if the detector track circuit is unoccupied, switch indication means controlled by said switch indication relay to indicate the position of the switch, and track indication means arranged to indicate the occupancy of said detector section when both said indication relays are deenergized.

14. In combination, a detector section of railway track including a track switch, a track relay controlled by traffic conditions adjacent the switch, a switch indication relay at a point remote from the switch, controlled in accordance with the position of the switch, a second indication relay at said point controlled in accordance with the condition of traffic governing apparatus adjacent the switch, means preventing the energization of either indication relay unless said track relay is energized, and means controlled by both said indication relays for indicating the condition of said track relay.

HARRY C. VANTASSEL.